Feb. 27, 1923.
A. L. MORSE.
RESILIENT WHEEL.
FILED AUG. 6, 1919.
1,446,922.
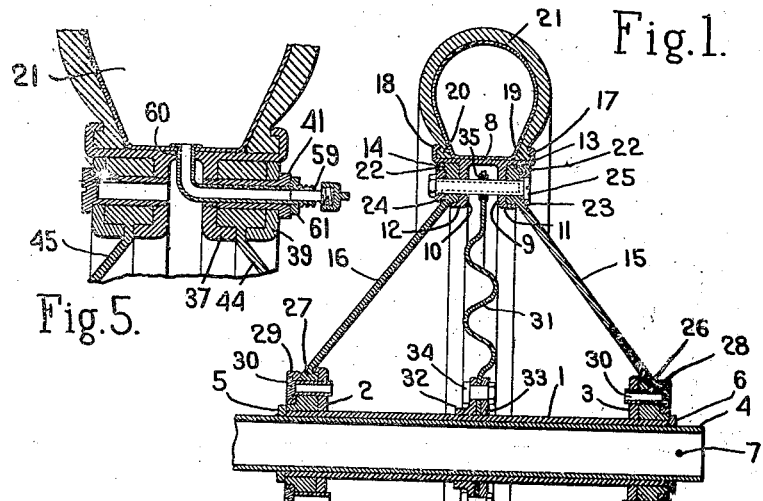
Fig.1.
Fig.5.
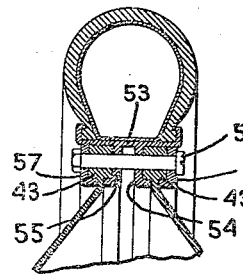
Fig.3.
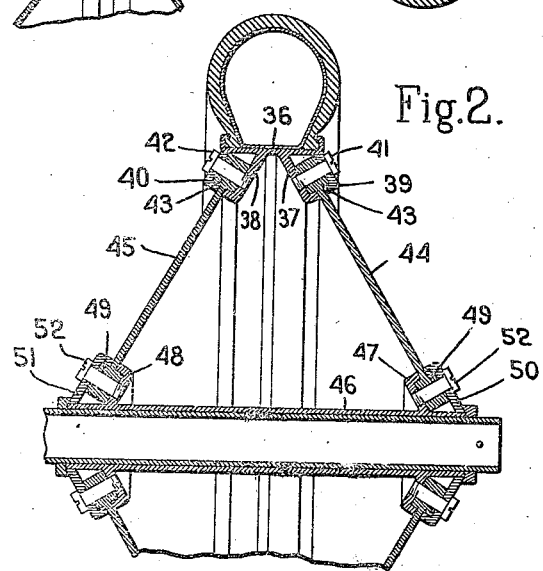
Fig.2.
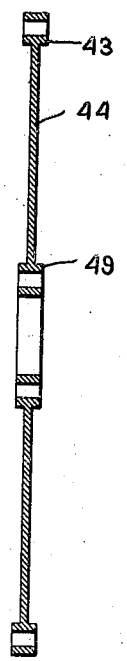
Fig.4.
Inventor.
Alan L. Morse
by Heard Smith & Tennant.
Attys.

Patented Feb. 27, 1923.

1,446,922

UNITED STATES PATENT OFFICE.

ALAN L. MORSE, OF ARLINGTON, MASSACHUSETTS.

RESILIENT WHEEL.

Application filed August 6, 1919. Serial No. 315,625.

To all whom it may concern:

Be it known that I, ALAN L. MORSE, a citizen of the United States, and resident of Arlington, county of Middlesex, State of Massachusetts, have invented an Improvement in Resilient Wheels, of which the following description, in connection with the accompanying drawing, is a specification, like characters on the drawing representing like parts.

This invention relates to improvements in resilient wheels and the object thereof is to provide a resilient wheel which will be capable of yielding under strain applied in substantially any direction and which will be restored to its initial condition immediately when the strain is relieved.

More specifically the object of the invention is to provide a resilient wheel which is particularly adapted for use in the landing gear of aeroplanes, the landing wheels of such structures being subjected to unusual strains which are likely to be imposed upon them in any direction. Where ordinary wheels such as are used upon automobiles and like vehicles are employed the lateral strain due to the side slippage of the plane in landing is often such as to fracture the wheel, thereby permitting the plane to crash with more or less force upon the ground. In such case the broken parts of the wheel also damage the body or the wings of the plane.

A further object therefore of the invention is to provide a resilient wheel which will be capable of yielding under strains imposed in any direction without fracturing.

Another object of the invention is to provide a resilient wheel in which the yielding resistance will be distributed uniformly over an increasing larger portion of the arm as the resistance is increased. This is accomplished in the present invention by providing elastic disks connecting the felly to the hub, said disks being conoidally diverging, preferably under tension, from the felly to the hub.

A further object of the invention is to provide a novel means for clamping the disks to the felly and the hub.

A further object of the invention is to provide means for limiting the stretching movement of the disks so that the same may not be stretched beyond their elastic limit and thereby injured or destroyed.

Other objects and features of the invention will more fully appear from the following description and the accompanying drawings and will be pointed out in the annexed claims.

Preferred embodiments of my invention are illustrated in the accompanying drawing in which, Fig. 1 is a vertical central sectional view of a wheel and hub embodying my invention mounted upon an axle which also is shown in section.

Fig. 2 is a similar sectional view of a resilient wheel showing a modified form of construction.

Fig. 3 is a detail sectional view of the felly, tire and a portion of the elastic disks showing a modified form of means for securing the disks to the felly, and, Fig. 4 is a vertical sectional view of the forms of disks illustrated in connection with Figs. 2 and 3, and, Fig. 5 is a detail sectional view of the felly having a pneumatic tire connected thereto showing the inflation tube extending through one of the hollow screws for clamping the disks to the flange upon the felly.

The resilient wheel illustrated in the accompanying drawings comprises broadly a hub and a felly connected by annular disks of resilient material secured to the felly and the hub, conoidally divergent from the felly to the hub and preferably but not necessarily maintained under tension. The hub comprises a cylindrical member 1 having flanges 2 and 3 one of which may be made integral with the head if desired and the other welded or otherwise secured to it, or both flanges may be made integral with the head if the latter is turned from solid stock. The hub 1 is adapted to be mounted upon an axle 4 in any usual manner. As shown in the drawing the axle 4 is provided with a collar 5 which may be integral with it or welded or otherwise secured to it adapted to engage the inner end of the hub, a similar collar 6 slidably mounted upon the outer ends of the axle secured to the plates by a pin 7 or by a nut or other fastening device serving to retain the hub in position upon the axle.

The felly comprises a ring portion 8 preferably having integral inwardly extending flanges 9, 10 provided with laterally bent edge portions 11 and 12 forming with the body of the flanges and the felly, channels 13, 14 adapted to receive the peripheral edges of disks 15, 16 of resilient material such as preferably highly elastic rubber.

The rim of the felly is also provided with clincher flanges 17, 18 having inturned edges adapted to engage the enlarged or thickened clincher portions 19 and 20 of the shoe of a resilient preferably pneumatic tire 21. The felly may be provided with one removable flange, or ring, adapted to permit the tire to be removed and replaced in a usual manner, or may be provided with means for permitting the removal and replacement of a rim having the tire mounted upon it.

The disks 15 and 16 desirably are provided with thickened peripheral annular portions 22 which are clamped in the channels 13 and 14 of the felly by rings 23, 24 or other suitable clamping plates which may be secured in clamping position by bolts 25 passing through the rings, the thickened portions of the disks and the flanges as illustrated in Fig. 1, said plates serving thereby not only to secure the periphery of the disks firmly in the channels but also to strengthen the flanges of the felly.

The disks 15 and 16 are also provided with thickened anchoring portions 26, 27 adapted to engage the flanges 2, 3 upon the hub and are clamped thereupon by rings 28, 29 having preferably suitable screws 30 passing through them and entering screw threaded apertures in the flanges 2 and 3. The screws 30 preferably are of large diameter in order to prevent tearing or cutting of the thickened portion of the resilient disks 15 and 16 and desirably may be made hollow.

The flanges 2 and 3 of the hub are placed at a considerably greater distance apart than the flanges 9 and 10 upon the felly so that the disks 15 and 16 will diverge conoidally from said disks to the felly. The disks may be molded in substantially the conoidal form desired or may be made flat but in either event desirably are of such size that when secured to the felly and hub will be under considerable tension. When the wheel is thus constructed the pressure upon the axle of the wheel tends to stretch the portions between the axle and substantially the outer half of the disks. As the axle descends under the yielding of the resilient disks 15 and 16 the area which is subjected to stretching increases and consequently the resistance increases as the axle is forced down below the geometrical center of the felly.

In order to prevent so great stretching as to exceed the limit of elasticity of the disks and thereby cause a breakage or tearing of the disks a non-resilient means preferably is secured to the hub and the felly in the central plane of the rib of the felly and normal to the axis of the hub. A preferred means comprises a web of inelastic material 31 which may be secured to a flange 32 upon the hub by a clamping ring 33 and bolts 34 and at its periphery to the felly in any suitable manner, for example the web 31 may be provided with grommets 35 through which the bolts 25 may pass.

It will be understood that any other suitable inelastic means may be provided for thus limiting the movement of the axle relatively to the felly as for example, cords, chains or other flexible means.

In Fig. 2 a modified construction is disclosed in which the felly 36 is provided with flanges 37, 38 which diverge in the direction of the walls of the disks when assembled in the wheel. Clamping rings 39 and 40 held by screws 41, 42 serve to secure the thickened edges 43 of the disks 44, 45 to the felly. Both the flanges and clamping disks preferably are provided with complementary laterally flanged edges to form channels to receive said thickened portions of the disk. The hub 46 is of tubular form and is provided with inclined flanges 47, 48 extending in alinement with the flanges 37 and 38 upon the felly so that a straight tension is imposed upon the web portion of the disks. The thickened walls 49 of the disks 44 and 45 are secured to the flanges 47, 48 by clamping rings 50, 51 and suitable screws 52 preferably of the character above described.

The clamping rings and flanges desirably are provided with inturned edges which cooperate to embrace the thickened portions 49 of the disks 44, 45. In this construction the disk preferably is molded flat as illustrated in Fig. 4 and is placed under tension when assembled in the wheel.

In Fig. 3 a still further modified structure is disclosed in which the felly 53 is provided with flanges 54 and 55 extending in parallelism with the central plane of the felly, the enlarged portion 43 of the disks such as those illustrated in Fig. 4 being clamped against said flanges by rings or clamping plates 56, 57 secured together and to the flanges 54, 55 by bolts 58 passing through said clamping rings, the thickened portions 43 of the disks and the flanges 54, 55.

In Fig. 5 I have illustrated a convenient provision for the inflation tube for the pneumatic tire. The inflation tube 59 of the pneumatic tire 21 is carried through an aperture 60 in the felly, and thence through one of the hollow screws 41 which serves to bind the clamping ring 39 upon the flange 37. In assembling the wheel the tire is first placed upon the felly, the disk 44 secured in place, the inflation tube passed through one of the hollow screws which is apertured throughout its length and the inflation tube secured in place by suitable means 61. The other disk 45 is then secured in place as illustrated. Any other suitable means may of course be employed for bringing the end of the inflation tube to the outside of the wheel where it will be accessible for pumping up the tire.

It will be understood that the embodiment of the invention disclosed herein is illustrative and not restrictive and that various modifications may be made within the meaning and scope of the following claims.

Having thus described my invention what I claim as new and desire to secure by Letters Patent is:

1. A resilient wheel comprising a hub and a felly, and annular disks of elastic rubber connecting said hub and said felly, said disks conoidally diverging under tension from said felly to said hub.

2. A resilient wheel comprising a hub and a felly, annular disks of elastic material having thickened annular interior and peripheral anchoring portions and clamping means on said hub and felly engaging respectively said thickened portions and maintaining said disks conoidally diverging under tension from said felly to said hub.

3. A resilient wheel comprising a hub and a felly, annular disks of elastic material having thickened annular interior and peripheral anchoring portions, channeled flanges on said hub and a clamping ring co-operating therewith engaging the interior thickened portion, channeled flanges on said felly and co-operating clamping means engaging the peripherally thickened portion, the flanges of said hub being spaced apart to cause said disks to diverge conically under tension.

4. A resilient wheel comprising a hub and a felly, and annular disks of elastic material connected to said hub and said felly, said disks conoidally diverging from said felly to said hub and an inelastic flexible means intermediate of said disks connecting said felly to said hub and acting to limit the stretching movement of said disks.

5. A resilient wheel comprising a hub and a felly, and annular disks of elastic rubber connected to said hub and said felly, said disks conoidally diverging under tension from said felly to said hub and an inelastic flexible annular member of greater diameter than the distance from the hub to the felly connected to said felly and said hub in a plane normal to the axis of the hub, acting to limit the stretching movement of said disks.

6. A resilient wheel comprising a hub and felly, annular disks of elastic material connecting said hub and felly, said disks conoidally diverging from said felly to said hub and means for connecting said disks to said felly and said hub including flanges upon the hub and felly respectively extending in substantially the direction of the walls of said disks.

In testimony whereof, I have signed my name to this specification.

ALAN L. MORSE.